Nov. 11, 1969     A. BAHR     3,477,578
DRY BED INSTALLATION FOR DRYING SLUDGE IN SEWAGE CLEARING PLANTS
Filed Aug. 30, 1967     6 Sheets-Sheet 1

INVENTOR:
ALBERT BÄHR
BY Robert H[...]
AGT.

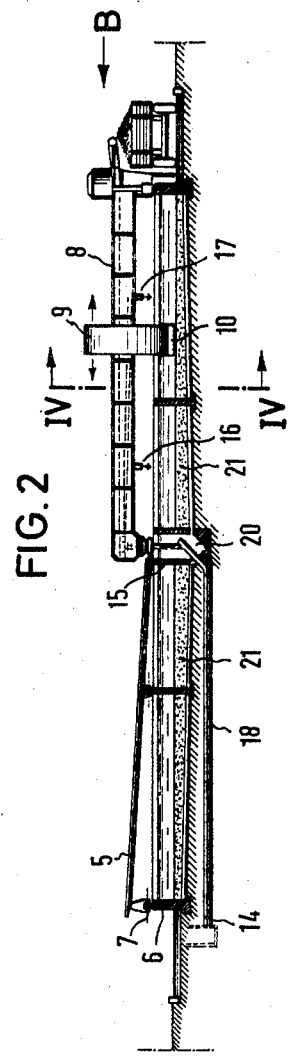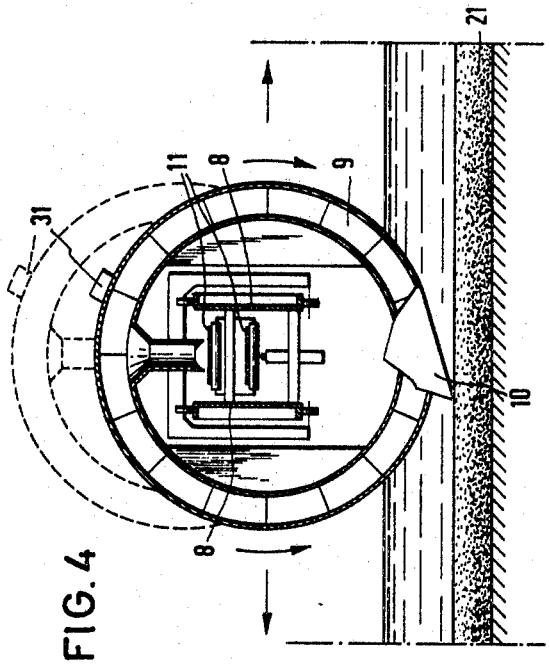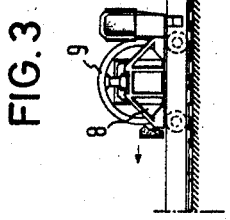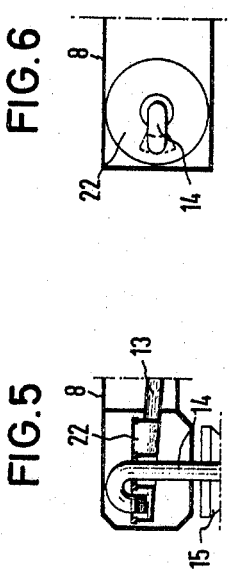
INVENTOR
ALBERT BÄHR

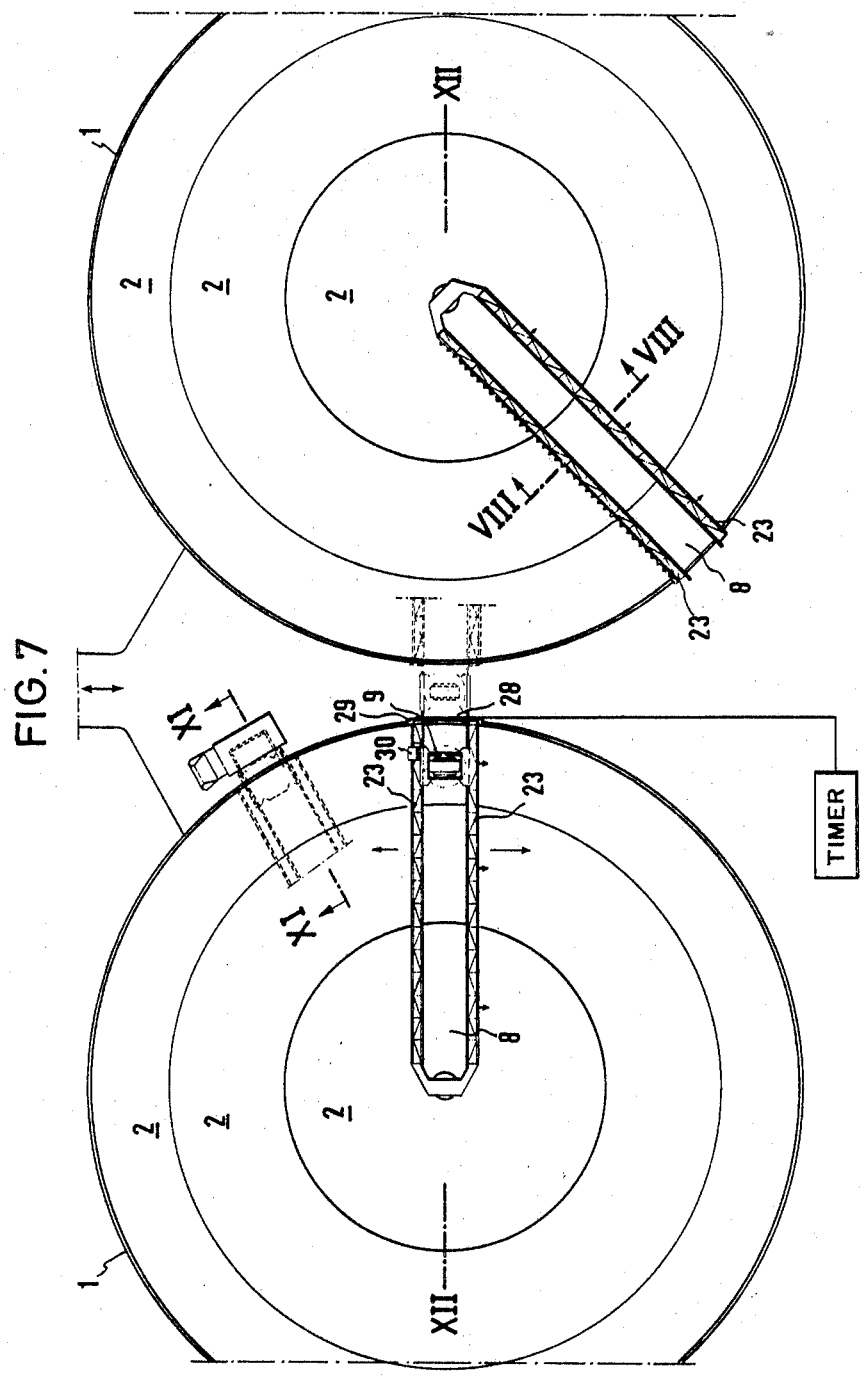

United States Patent Office 3,477,578
Patented Nov. 11, 1969

3,477,578
DRY BED INSTALLATION FOR DRYING SLUDGE IN SEWAGE CLEARING PLANTS
Albert Bahr, Parallelstrasse 2a, Elversberg, Saar, Germany
Filed Aug. 30, 1967, Ser. No. 664,399
Claims priority, application Germany, Sept. 2, 1966, M 70,804; June 2, 1967, M 74,242
Int. Cl. C02c 1/36
U.S. Cl. 210—138
11 Claims

ABSTRACT OF THE DISCLOSURE

Drying bed installation for sewage plant having a radial carrying bridge supported for rotation centrally of the drying bed or beds and riding with its outer end of the wall of the bed, and a cell wheel movable longitudinally on the rotatable bridge which picks up sludge with a scraping knife at its lower apex and discharges it inwardly from the upper apex, and where the bridge may also be equipped with downwardly extending plowshares for loosening sludge.

BACKGROUND OF THE INVENTION

The invention relates to sewage plants. In sewage plants for clearing the effluent from cities and industries, it is customary to store the sludge or sewage segregated from the water in drying beds and remove it again from these drying beds to be transported away after the sludge is sufficiently dried.

In drying beds of this type, the sludge or sewage is stored over a filter bed of gravel, clinker, or other filtering material through which the water that is separated from the sludge runs off and is carried away through drainage ducts below the filter bed.

Drying beds of this type were conventionally arranged in fields of rectangular form disposed alongside one another. Here the removal of the dried sludge and the problem of supplying fresh sludge were not only difficult and time-consuming tasks, but such beds required also high installation costs, while also the drainage ducts below the filter bed resulted in considerable expenses.

It is already known to construct such drying beds in circular areas which were spanned radially by a carrier bridge that could be turned about the center of the circular bed. This bridge carrier was provided with scrapers which were intended to feed the sludge during the rotating of the bridge carrier toward the center of the bed into central funnel, through which the sludge was supplied to a conveyor below the filter layer of the bed. However, any systematic removal of the dried sludge was not possible with a scraping arrangement of this type and the conveyor disposed below the bed was expensive to install and difficult to supervise during operation. The supplying of fresh sludge onto the filter layer of the drying bed was effected in this known installation by supply ducts passing through a horizontal supply conduit below the filter layer and vertically upward through the filter layer. The drainage conduits below the filter layer were arranged here at certain distances horizontally transversely of the circular surface. This known drying installation involved a considerable expenditure in the construction and cumbersome operation.

SUMMARY OF THE INVENTION

It is an object of the invention to avoid the aforesaid shortcomings of the drying bed installations known heretofore.

In accordance with the invention a drying bed installation is to be provided which involves low installation costs, makes possible efficient clearance and removal of the dried sludge from the surface of the bed, allows drying the sludge in a short time period and which affords a simple and cheap possibility as regards the supply of fresh sluge and the removal of the drainage water that is separated out of the sludge.

The invention concerns a dry bed installation for drying sludge where a bridge with devices for removing sludge is provided over a bed of circular shape and rotatable about the center point of the bed and which spans the bed from the center point to the border, and it consists essentially in that a cell wheel is mounted on the rotatable bridge for transport longitudinally of the bridge and which at its lower apex point picks up the sludge by means of a scraping knife and discharges it inwardly at its upper apex point. Such a cell wheel is disclosed and described in detail in applicant's copending application Ser. No. 664,398 filed Aug. 30, 1967, entitled Sludge Treating and Moving Apparatus for Dry Beds of Sewage Plants.

In a drying bed installaton in accordance with the invention, it is possible according to one embodiment for the cell wheel to surround the belt conveyor arranged on the bridge, onto which the cell wheel which has picked up the sludge at its lower apex drops the sludge from its upper apex.

Embodiments of the invention are also possible where the cell wheel is provided on its interior with a hopper for receiving the sludge and is transportably mounted with the hopper on a discharge arm into a discharging position.

In a drying bed installation in accordance with the invention, supply ducts for fresh sludge and for conducting away the drainage water from the filter bed towards the center of the bed are arranged centrally of the bed. The bridge here is equipped with distributing conduits to which the fresh sludge is supplied by the supply conduit entering at the center of the bed, and from which the fresh sludge is discharged onto the upper surface of the bed and is evenly distributed by rotating the bridge.

In order to make possible the drying of the sludge in as short a time as possible, one embodiment of the invention provides for protecting the bed surface at least partly against the entrance of rain water in the that the bridge is connected with a cover which is supported for transport by means of a motor or other prime mover on the outer border of the bed and rotatable about the center point of the bed, and which protects the bed surface at least partly against rain and permits the rain water to flow off toward the center of the bed.

On the other hand, it is possible in accordance with another embodiment of the invention to accelerate the drying of the sludge effectively in that the bridge is equipped with devices for loosening the sludge that can be driven out or flopped or turned over. As the bridge rotates about the center point, the sludge is loosened in accordance with this embodiment of the invention and therefore dries quicker. Also in the event of rain, the rain water flows off easier and more rapidly downwardly through the loosened sludge.

The cell wheel may here be transportably arranged from the bridge into a position of rest outside of the bridge carrier so that the operation takes place in a manner that the cell wheel removes the dried sludge and then is transported into position of rest. Thereupon, fresh sludge is supplied by a sludge supply conduit by way of the bridge and distributed during rotation of the bridge over the surface of the bed. The loosening devices disposed on the bridge are then brought into operating position and the fresh sludge is loosened to accelerate the drying by constantly rotating the bridge. When the sludge has been dried sufficiently, the cell wheel is again driven onto the bridge and now the clearance of the dry sludge can take place.

In this connection, it is also possible to arrange a cell wheel for two or more beds so that the cell wheel carries out a clearing operation on one bed, while fresh sludge is loosening and more rapidly dried by the loosening devices in the other bed. Meanwhile, fresh sludge can be supplied to the third bed.

BRIEF DESCRIPTION OF THE DRAWINGS

Further advantages and objects of the invention will become apparent from the following description with reference to the embodiments illustrated in the drawings and in which FIG. 2 is a cross-section along the line II—II in FIG. 1, FIG. 3 is a view taken in the direction of the arrow B in FIG. 2, FIG. 4 is a section along the line IV—IV of FIG. 2, FIG. 5 is an enlarged section taken through the center of that bed, FIG. 6 is a top view of FIG. 5, FIG. 7 illustrates another embodiment of the invention in plan view.

Figure 1:
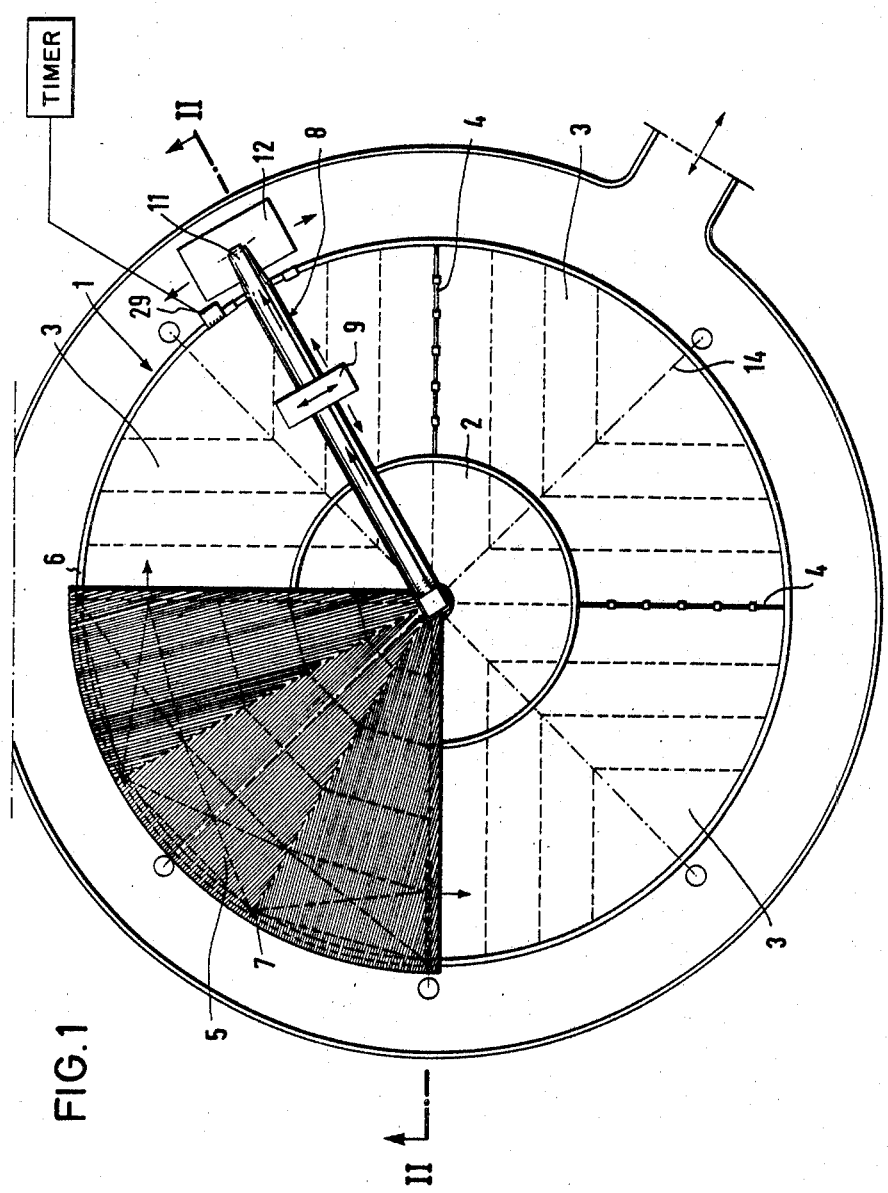
FIG. 1 is an embodiment of the invention with a clearing apparatus on a circular bed in plan view.
Figure 8:
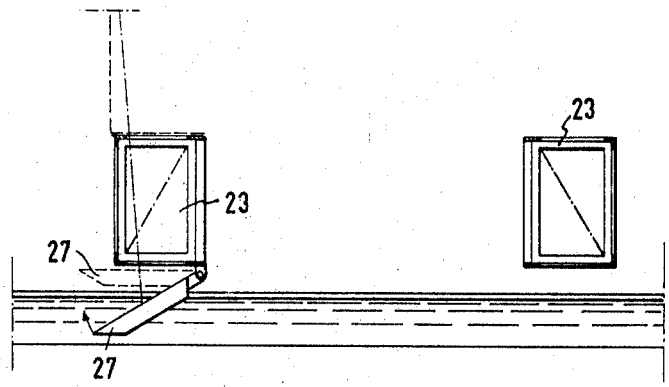
FIG. 8 is a section along the line VIII—VIII of FIG. 7.
Figure 9:
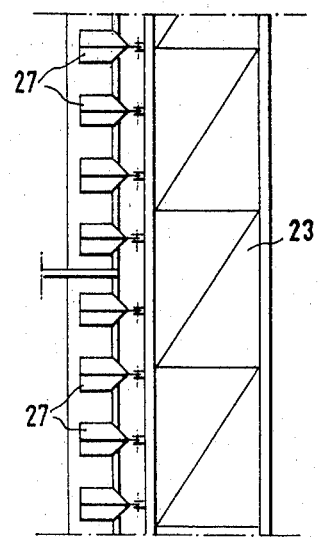
FIG. 9 is a view taken from the left of FIG. 8.
Figure 10:
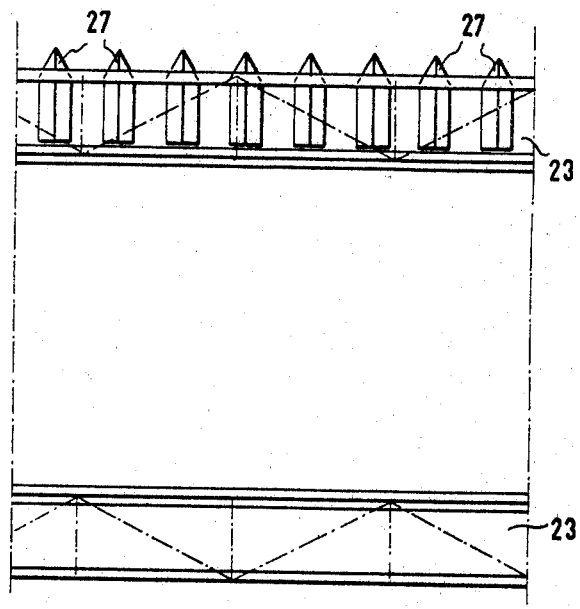
FIG. 10 is a top view of FIG. 8.

A circular drying bed 1 is shown in the drawing where the sludge to be dried rests on a filter bed 21, through which the water separated from the sludge during drying flows off. The circular surface of the bed in the embodiment illustrated in FIG. 1 is sub-divided into an inner circular surface area 2 and, for example, four outer segments 3.

The segments 2 and 3 are separated by intermediate walls 4 in the embodiment in accordance with FIGS. 1 and 2. The roofing 5 is disposed over the sector of the circular plane at the upper left side. This roofing may be in the form of corrugated plates of plastic material. The 90° segment of the roofing is rotatable about the center point of the circular bed 1 and can be driven on the outer wall 6 by means of rollers 7. Furthermore, the roofing 5 is inclined toward the center of the bed. Between the outer wall 6 and roofing 5, an air gap is provided through which the air entering centrally of the bed which has been warmed up by the greenhouse atmosphere can depart together with the moisture. A further roofing segment 5 may be provided in the sector at the lower left or at the lower right.

The bridge 8 freely spans the radius of the bed and is rotatable upon a hollow center stud and preferably journalled on the outer wall of the bed on which it is driven by motor 29 and can ride by means of trackless rubber wheels about the entire circumference of the bed. Besides a conveyor belt 11, the clearing bridge 8 supports a clearing device in the form of a cell wheel 9, provided with a scraping knife 10. The cell wheel 9 with scraping knife 10 is transportable along the bridge 8 in longitudinal direction by means of motor 30. A motor 31 drives the cell wheel, and the sludge which is picked up at the lower vertex by means of the scraping knife 10 is moved by the blades of cell wheel and at its upper vertex the cell wheel 9 discharges the sludge inwardly onto the belt conveyor 11 on the clearing bridge. The scraping knife 10 which may be tiltable or rotatable about a horizontal axis is suitably oriented in the direction of the longitudinal axis of the bridge 8 when in operating position so that also the clearing of the sludge out of the bed in radial strips takes place in that the cell wheel is driven longitudinally of the bridge.

However, a different manner of operation is still possible, where the bridge 8 for clearing operations turns with the cell wheel 9 about the center point and where the sludge is picked up by the cell wheel 9 in circular strips.

The conveyor 11 discharges at its free end into a vehicle 12 which may also be temporarily coupled with the bridge 8, particularly when the clearing of the sludge takes place during turning of the bridge 8.

In order to regulate its working depth the cell wheel 9 is arranged to be raised and lowered with respect to the bridge 8.

A supply conduit 14 is arranged below the bed and its filter bed 21 for the introduction of the fresh sludge, which conducts the fresh sludge, for example, from the fermenting tower of the sewage plant (not illustrated) into the hollow center stub 15, and there supplies it to a distributing box 22 arranged at the inner end of the bridge 8. From the distributing box 22 the fresh sludge is moved to two conduits or ducts 13 disposed in the bridge 8, which are each provided with a discharge opening 16 for the inner section 2 of the bed and with a discharge opening 17 for the outer segments 3 of the bed.

The fresh sludge reaches the upper surface of the bed through the discharge opening 16 and 17 and is evenly distributed over the associated bed surface by the simultaneous turning of the bridge 8. By feeding in the sludge by means of the rotating bridge 8 in accordance with the invention, a considerably better filling of the beds can be achieved than was possible heretofore with a stationary conduit or also with stubs passing vertically through the filter bed.

As shown by the illustration in FIG. 2, the bottom of the bed is inclined inwardly below the filter bed 21 so that the water flowing out of the sludge through the filter bed toward the center of the bed, flows off to the hollow space 20 within the hollow center stub 15. From there the drainage water is conducted away through a conduit 18.

The two individual segments of the roofing 5 are supported on the center king pin and by way of the rubber wheels on the annular walls of the bed. They are individually displaceable by means of the clearing bridge 8 so that they can be placed over any desired surface area of the bed. In view of the inclination of the roofing 5 inwardly, the rain water picked up thereby is conducted away inwardly and carried off through the central drainage ducts 18.

In the embodiment in accordance with FIGS. 1 and 2 of the drawings, the two individual segments of the roof are usually disposed over the individual beds which are filled at the time for drying. The clearing apparatus at that time is disposed over the open fields. If the upper layer of the covered beds has been dried and is ready for clearing, the clearing apparatus moves the roofing segments aside and removes the dried upper layer. Subsequently, the bridge returns the roofing back over the beds, and after a suitable drying period 5–10 cm. of the upper layer are again removed in the same type of operation. Thus the roof covered beds are slowly emptied; during this time the beds not covered are supplied with fresh sludge, for which purpose the carrying bridge is pivotally moved for pouring out the sludge.

As a whole the operation may be such that the roof covered beds are completely emptied by the time the beds not covered are filled with fresh sludge. Thus a continuous operation may be achieved. The roofing is then moved over the freshly filled beds, and the emptied beds are readily for receiving the fresh sludge.

Figure 11:
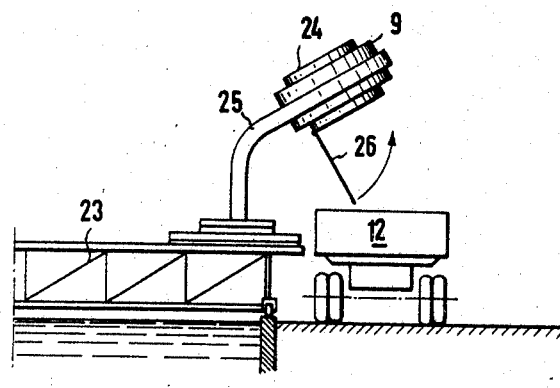
FIG. 11 is a section along line XI—XI of FIG. 7.
Figure 12:
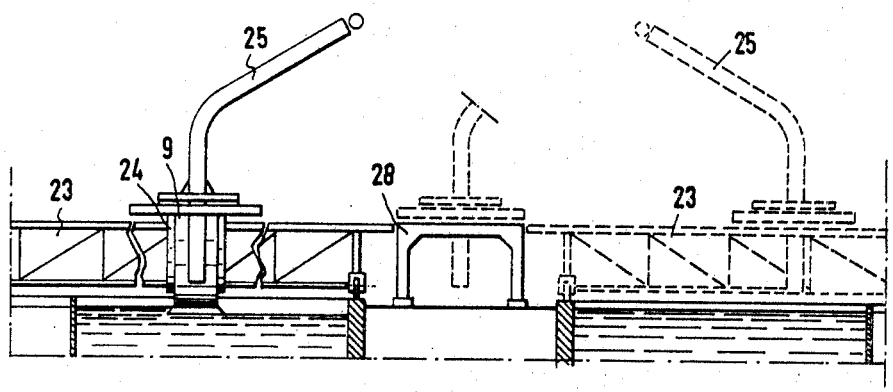
FIG. 12 is a section taken along line XII—XII in FIG. 7.

Another proposal for accelerating drying of the sludge in the sludge beds is illustrated in the embodiments in accordance with FIGS. 7-12. In this embodiment a pair of circular beds 1 are shown alongside one another, the circular areas of which are sub-divided by intermediate walls into this circular or annular surface area 2. On each of the circular beds a bridge 8 is rotatable about the center point which preferably may be defined by two supporting frames 23 arranged at a distance from one another. Between the supporting frames 23 a cell wheel 9 having a scraping knife is movably arranged longitudinally of the bridge 8. This cell wheel, as shown particularly in FIG. 11, is provided on its interior with a hopper 24 which receives the sludge that has been picked up in the cell wheel by means of the scraping knife. The cell wheel 9 and the hopper 24 are also movable on a discharging arm 25 as illustrated in FIG. 11, which shows the hopper at the discharging position where the discharging flap 26 is open for discharging the sludge from the hopper 24 into the vehicle 12. This arrangement is similar to that disclosed in Applicant's copending application referred to above, and the arm 25 may be arranged as described in my copending application filed simultaneously herewith, Ser. No. 664,398.

The cell wheel 9 with the hopper 24 and the unloading arm 25 can also be arranged to rotate through 360° on the drive unit by means of which the cell wheel is driven longitudinally of the bridge 8.

During removal of the effluent water sludge dried in the individual areas of the beds 1, the cell wheel 9 receives the dried sludge at its lower vertex by means of a scraping knife and discharges it at its upper vertex into the inner hopper 24. If the inner hopper 24 is filled, the bridge 8 moves into the discharging position indicated on the left in FIG. 7 and in a partial view in FIG. 11. During clearing operations, the bridge 8 with the cell wheel 9 effects a circular movement about the center point of the bed 1. In accordance with the invention the bridge supports 23 are provided with fluffing or loosening devices 27 on one or both sides, which are illustrated in detail in FIGS. 8, 9 and 10. These loosening devices may, for example, be arranged on the carrier frame 23 in a manner to be lowered, or they may be pivotally arranged and constructed so that they can dip into the sludge bed to the desired depth in order to loosen the sludge as the bridge 8 rotates, and thereby accelerate the drying process. The loosening devices 27 may, for example, be in the form of plowshares and may be moved into and removed from the required operating position individually or in groups, manually or by a motor drive means.

Since the cell wheel 9 is not needed for this loosening operation, it is possible in accordance with the invention to provide a platform 28 outside of the beds 1 where the cell wheel 9 may be placed in a position of rest. The drive unit for the bridge 8 is provided with motors operated by means of switches and rotates during loosening operations, for example at a velocity of 0.05 m./sec. along the outer wall of the beds 1, The operator lowers the plowshares 27 secured to the bridge to the required depth in the sludge in the ring of the bed to be loosened; where required he may also loosen two beds simultaneously. He starts the operation of the bridge 8, which now moves automatically over the beds, and that as long as two or three hours as determined by the time set on a clock, the inserted plows 27 loosen and turn over the sludge uninterruptedly. After the time set, the bridge 8 stops automatically, and will again start to run automatically depending on the setting of the time clock. To be sure, the time clock can be stopped and the sludge stirring can take place uninterruptedly day and night. The automatic sludge loosening is of significance during sunshine as well as in rain. During sunshine very intensive drying is accomplished, while during rain the rain water which runs in is more readily carried away into the drainage as a result of the loosening.

In addition the beds can also be protected by a cover of plastic or the like, as protection against rainfall.

When the bridge 8 works with its loosening devices, the work can be performed under remote control by a time clock, so that it carries out the loosening operation at predetermined times and then will come to a standstill.

Having now described my invention with reference to the embodiments illustrated in the drawings, what I desire to protect by Letters Patent of the United States is set forth in the appended claims.

I claim:

1. Sewage plant dry bed installation for sludge or the like, comprising a filter bed having a border wall, a carrying bridge rotatably supported at one end centrally of the bed and at the other end on said border wall, means to feed the material to be treated to said filter bed, means to withdraw treated effluent from said filter bed, and means to convey sludge from said filter bed to disposal mounted on said bridge and including a scraping knife and a cell wheel for moving sludge and a conveyor disposed in sludge receiving relation to said cell wheel, motor means for rotating said cell wheel, motor means for moving said cell wheel longitudinally of said bridge, said scraping knife being disposed at the lower vertex of said cell wheel and operative to feed sludge to said cell wheel, and said cell wheel being adapted to raise and discharge the sludge inwardly at its upper vertex onto said conveyor.

2. Sewage plant dry bed installation in accordance with claim 1 wherein said conveyor is disposed on said carrying bridge and extends through said cell wheel in receiving relationship to the upper vertex of said wheel, operative to carry off sludge discharged by said wheel.

3. Sewage plant dry bed installation in accordance with claim 1 including a hopper, said cell wheel extending around said hopper in discharge relation thereto, a discharge arm supporting said cell wheel and hopper on said carrying bridge and means operative to move said cell wheel and hopper on said discharge arm from a charging position to a discharging position.

4. Sewage plant dry bed installation in accordance with claim 3 including an inactive position for said cell wheel endwise of said bridge and means for moving said cell wheel into said inactive position.

5. Sewage plant dry bed installation in accordance with claim 1 wherein said feed means comprises a supply conduit for fresh sludge disposed centrally of said filter bed and wherein said means to withdraw treated effluent comprises a discharge conduit for drainage water from the filter bed arranged centrally thereof and where the bed is inwardly inclined for conducting drainage water to the center.

6. Sewage plant dry bed installation in accordance with claim 5 comprising distributing conduits arranged on said bridge and connected at one end to said central supply conduit to receive fresh sludge, said conduits having discharge openings adapted to distribute the sludge over the surface of the bed while the bridge is being rotated.

7. Sewage plant dry bed installation in accordance with claim 1, comprising a roofing member pivotally supported at the center of the bed and inwardly inclined toward said center, and having an outer end movably supported on said border wall, and means for connecting said roofing member to said bridge for movement by said bridge.

8. Sewage plant dry bed installation in accordance with claim 1 including sludge loosening plowshares connected to said bridge and movable relative to said bridge and with said bridge.

9. Sewage plant dry bed installation in accordance with claim 8 including means for moving said loosening plowshares separately and in groups.

10. Sewage plant dry bed installation in accordance with claim 1 where said cell wheel is associated with a plurality of circular drying beds.

11. Sewage plant dry bed installation in accordance with claim 1 including time clock means associated with bridge drive motor means operative to move said bridge automatically over the filter bed.

References Cited

UNITED STATES PATENTS

| | | | |
|---|---|---|---|
| 1,953,100 | 4/1934 | Blaisdell | 210—526 |
| 2,075,207 | 3/1937 | Kessler | 210—523 X |
| 2,267,516 | 12/1941 | Adams | 210—520 X |
| 2,339,084 | 1/1944 | Lose | 210—264 |
| 2,897,149 | 7/1959 | Griffith | 210—138 X |
| 2,917,177 | 12/1959 | Hartley | 210—272 |
| 3,298,670 | 1/1967 | Crom | 259—5 |
| 3,176,845 | 4/1965 | Schenk | 210—150 |

FOREIGN PATENTS 723,709 2/1955 Great Britain.

JAMES L. DECESARE, Primary Examiner

U.S. Cl. X.R.

210—272, 520, 530